(12) United States Patent
Yoshikuwa et al.

(10) Patent No.: US 11,975,450 B2
(45) Date of Patent: May 7, 2024

(54) TRANSFER ROBOT

(71) Applicant: Kawasaki Jukogyo Kabushiki Kaisha, Kobe (JP)

(72) Inventors: Eiji Yoshikuwa, Kobe (JP); Toshiyuki Tsujimori, Kobe (JP); Kazunori Hirata, Kobe (JP); Takeshi Hashimoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 193 days.

(21) Appl. No.: 17/624,575

(22) PCT Filed: Jul. 2, 2020

(86) PCT No.: PCT/JP2020/026015
§ 371 (c)(1),
(2) Date: Jan. 4, 2022

(87) PCT Pub. No.: WO2021/006175
PCT Pub. Date: Jan. 14, 2021

(65) Prior Publication Data
US 2022/0274248 A1    Sep. 1, 2022

(30) Foreign Application Priority Data
Jul. 5, 2019 (JP) .................. 2019-125892

(51) Int. Cl.
*B25J 15/06* (2006.01)
*B25J 9/00* (2006.01)
*B25J 9/16* (2006.01)
*B25J 13/00* (2006.01)

(52) U.S. Cl.
CPC ........... *B25J 9/0087* (2013.01); *B25J 9/1682* (2013.01); *B25J 13/00* (2013.01); *B25J 15/0616* (2013.01)

(58) Field of Classification Search
CPC ........ B25J 9/0087; B25J 9/1682; B25J 13/00; B25J 15/0616
See application file for complete search history.

(56) References Cited

U.S. PATENT DOCUMENTS 10,632,581 B2 *   4/2020   Takeda .................. B25J 9/0018

FOREIGN PATENT DOCUMENTS

JP         2015-214350 A    12/2015

* cited by examiner

*Primary Examiner* — William C Joyce
(74) *Attorney, Agent, or Firm* — XSENSUS LLP (57) ABSTRACT

A transfer robot transfers workpieces while sucking upper surfaces of the workpieces. The transfer robot includes a first hand body attached to a first robotic arm, a second hand body attached to a second robotic arm, a first suction part attached to the first hand body, and a second suction part attached to the second hand body. The first suction part has a pair of suction bodies, the pair of suction bodies extending in a horizontal first direction and separated from each other in a horizontal second direction perpendicular to the first direction. The second suction part has at least one suction body extending in the first direction, and the one suction body is changeable in an entering amount into an area between the pair of suction parts of the first suction part according to a relative movement of the second hand body in the first direction.

12 Claims, 5 Drawing Sheets

TRANSFER ROBOT

CROSS-REFERENCE TO RELATED APPLICATIONS

The present application is based on PCT filing PCT/JP2020/026015, filed Jul. 2, 2020, which claims priority to JP 2019-125892, filed Jul. 5, 2019, the entire contents of each are incorporated herein by reference.

TECHNICAL FIELD

The present disclosure relates to a transfer robot which transfers workpieces while sucking upper surfaces of the workpieces.

BACKGROUND ART

Devices which transfer workpieces while sucking upper surfaces of the workpieces are known (see Patent Document 1). In Patent Document 1, a pair of arms are provided to a single suction head. The arms are moved to bring five workpieces, which are lined up laterally, close to the center, and the suction head sucks the five workpieces all at once.

REFERENCE DOCUMENT OF CONVENTIONAL ART

Patent Document

[Patent Document 1] JP2015-214350A

DESCRIPTION OF THE DISCLOSURE

Problem to be Solved by the Disclosure

If the entire width of the five workpieces is narrower than the width of the suction head, the arm cannot bring the workpieces closer in the width direction. Thus, the positions of the workpieces with respect to suction faces are not stable, and it requires a tool changeover for plugging up suction holes which are located outside of the workpiece(s).

One purpose of the present disclosure is to provide a transfer robot capable of continuing a transfer of workpieces while reducing the tool changeover as few as possible, even if the size of the workpieces is changed.

SUMMARY OF THE DISCLOSURE

According to one aspect of the present disclosure, a transfer robot is provided which transfers workpieces while sucking upper surfaces of the workpieces. The transfer robot includes a first robotic arm and a second robotic arm, a first hand body attached to the first robotic arm and configured to move according to operation of the first robotic arm, a second hand body attached to the second robotic arm and configured to move according to operation of the second robotic arm, a first suction part attached to the first hand body and configured to suck the upper surfaces of the workpieces, and a second suction part attached to the second hand body and configured to suck the upper surfaces of the workpieces. The first suction part has a pair of suction bodies, the pair of suction bodies extending in a horizontal first direction and separated from each other in a horizontal second direction perpendicular to the first direction. The second suction part has at least one suction body extending in the first direction, and the one suction body is changeable in an entering amount into an area between the pair of suction parts of the first suction part according to a relative movement of the second hand body in the first direction with respect to the first hand body.

According to this configuration, the suction part is provided to each of the two hand bodies. Even if the size of the workpieces is changed in the first direction, by operation of the two robotic arms to relatively move the second hand body with respect to the first hand body, the size of the entire suction part in the first direction can be adjusted without causing the interference between the first suction part and the second suction part. Therefore, the transfer of the workpieces can be continued without a tool changeover, such as a replacement of the hand body.

Effect of the Disclosure

According to the present disclosure, a transfer of workpieces can be continued while reducing tool changeovers as few as possible.

BRIEF DESCRIPTION OF DRAWINGS

FIG. 5 is a view of works performed by the transfer robot according to this embodiment, where FIG. 6A is a plan view illustrating a work for transferring three workpieces which are lined up laterally, and FIG. 6B is a plan view illustrating a work for transferring eight workpieces which are lined up laterally.

MODE FOR CARRYING OUT THE DISCLOSURE

Figure 1:
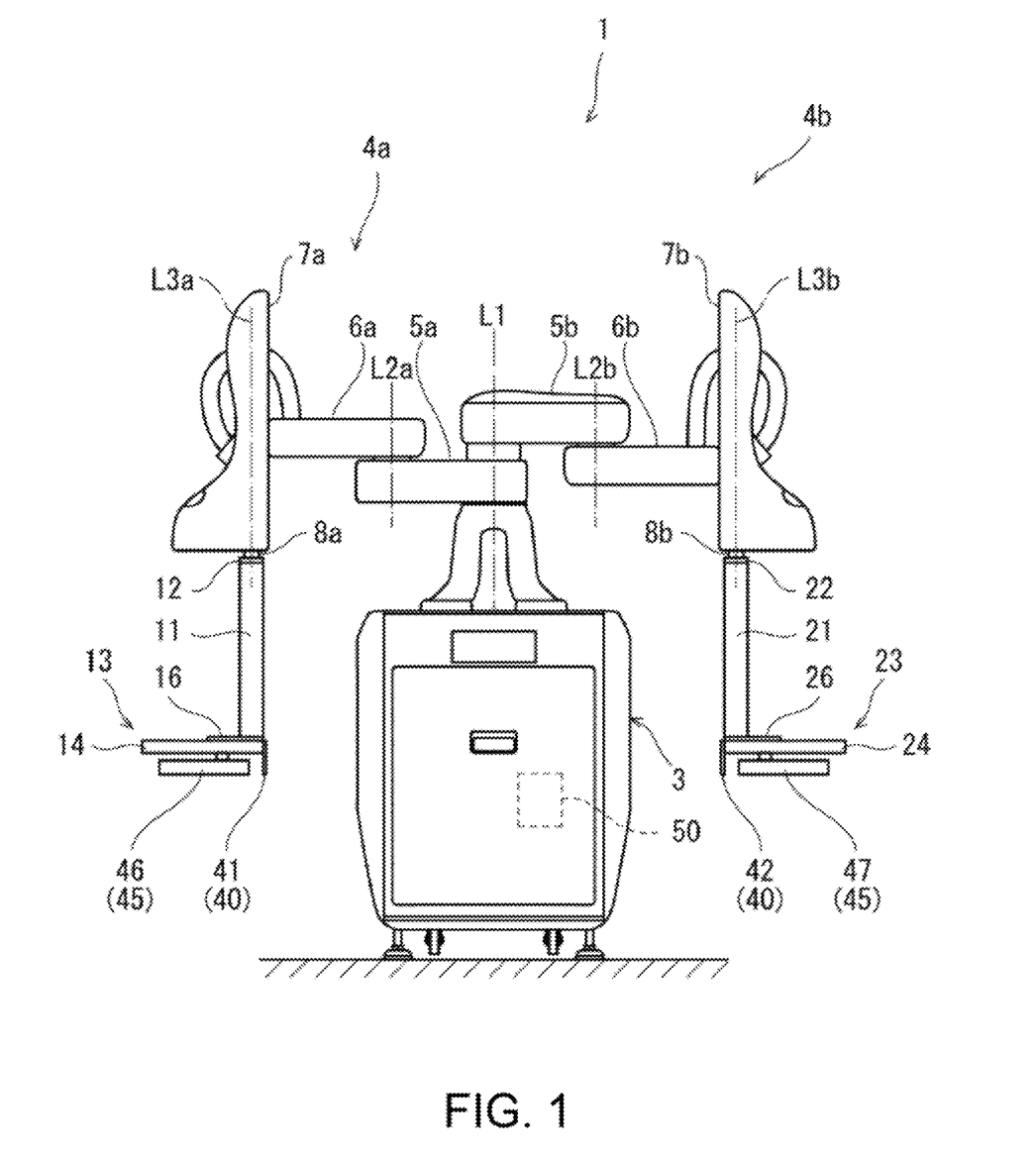
FIG. 1 is a front view of a transfer robot according to one embodiment.

FIG. 1 is a front view of a transfer robot 1. The transfer robot 1 includes a base 3, a first robotic arm 4a, a second robotic arm 4b, a first hand body 11, a second hand body 21, a first suction part 13, and a second suction part 23.

In this embodiment, a coaxial dual-arm robot is applied to the transfer robot 1 as one example. The base 3 is a single unit, and a base-end part of the first robotic arm 4a and a base-end part of the second robotic arm 4b are coupled to each other so as to be pivotable on the same axis (first axis) L1. Each of the first robotic arm 4a and the second robotic arm 4b is a horizontal articulated type. The first robotic arm 4a includes a first base-end arm 5a coupled to the base 3 so as to be pivotable on the first vertical axis L1, a first tip-end arm 6a coupled to a tip-end part of the first base-end arm 5a so as to be pivotable on a vertical second axis L2a, a first wrist part 7a coupled to a tip-end part of the first tip-end arm 6a so as to be elevatable in the vertical direction, and a first attaching part 8a coupled to a lower-end part of the first wrist part 7a so as to be pivotable on a vertical third axis L3a. Similarly, the second robotic arm 4b also includes a second base-end arm 5b, a second tip-end arm 6b, a second wrist part 7b, and a second attaching part 8b. The second base-end arm 5b is pivotable on the first axis L1 with respect to the base 3, the second tip-end arm 6b is pivotable on a vertical second axis L2b with respect to the second base-end arm 5b, the second wrist part 7b is elevatable in the vertical direction with respect to the second tip-end arm 6b, and the second attaching part 8b is pivotable on a vertical third axis L3b with respect to the second wrist part 7b.

The first hand body 11 has at its upper-end part a mounting part 12 which is detachably attached to a lower surface of the first attaching part 8a. The second hand body 21 has at its upper-end part a mounting part 22 which is detachably attached to a lower surface of the second attaching part 8b. The hand bodies 11 and 21 are each formed in a pillar shape. When the mounting parts 12 and 22 are attached to the corresponding attaching parts 8a and 8b, the hand bodies 11 and 21 extend downwardly from the corresponding attaching parts 8a and 8b.

By operation of the robotic arms 4a and 4b, the second hand body 21 is relatively movable with respect to the first hand body 11 at least in a horizontal first direction X. In this embodiment, the first hand body 11 and the second hand body 21 are changeable, independently from each other, in the three-dimensional positions and the three-dimensional postures according to the operation of the first robotic arm 4a and the second robotic arm 4b. The second hand body 21 is relatively movable with respect to the first hand body 11 in three directions which include, in addition to the horizontal first direction X, a horizontal second direction Y which is perpendicular to the first direction X, and a vertical direction Z.

Figure 2:
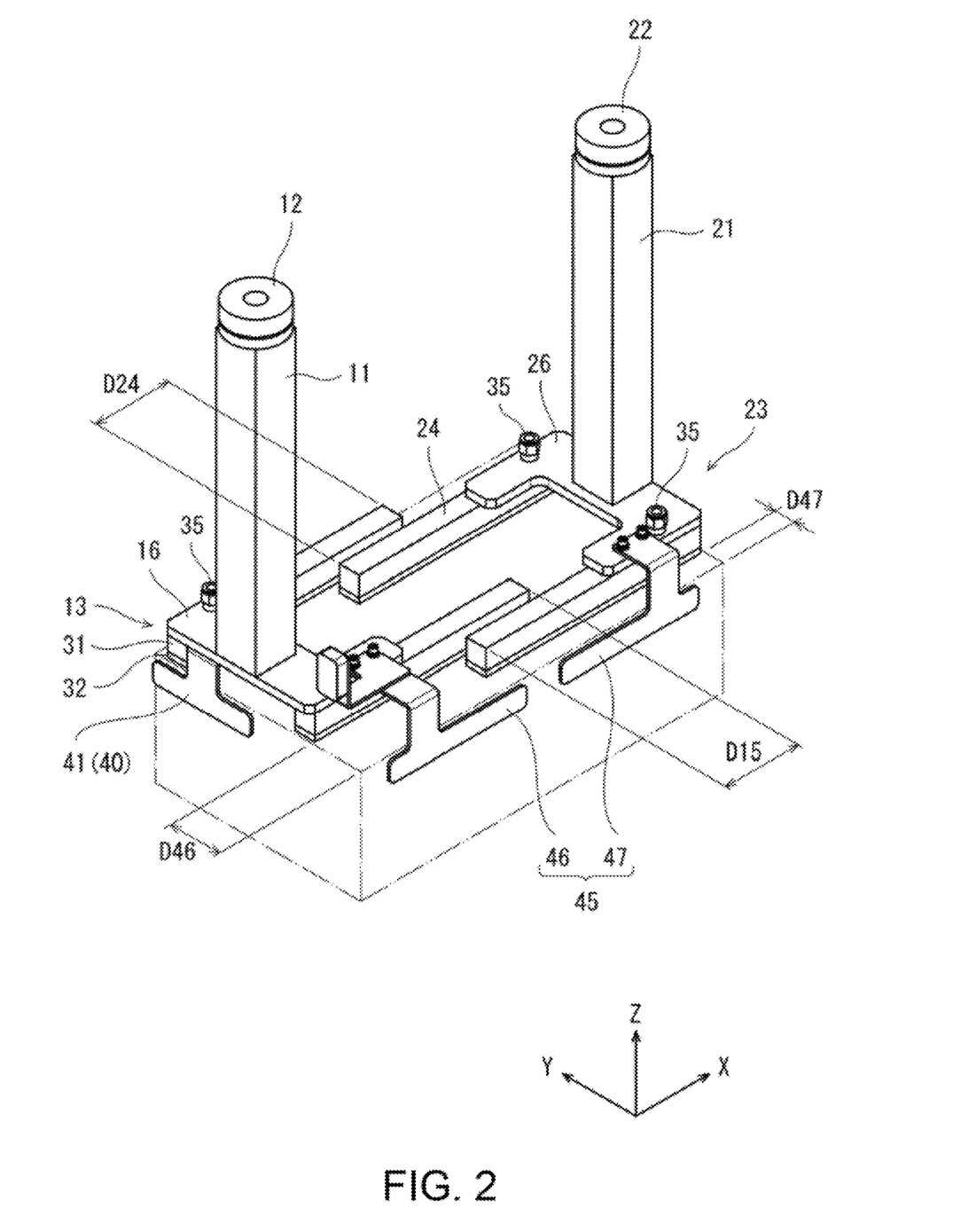
FIG. 2 is a perspective view illustrating a first hand body and a second hand body according to this embodiment.

The first suction part 13 is attached to the first hand body 11 and sucks an upper surface of a workpiece 90 (see FIG. 2). The second suction part 23 is attached to the second hand body 21 and sucks the upper surface of the workpiece 90.

FIG. 2 is a perspective view illustrating the hand bodies 11 and 21. The first suction part 13 has a pair of suction bodies 14 and 15. The pair of suction bodies 14 and 15 extend in parallel to each other. The second suction part 23 has at least one suction body. In this embodiment, the second suction part 23 has a pair of suction bodies 24 and 25. The pair of suction bodies 24 and 25 extend in parallel to each other.

FIG. 2 illustrates a state where the workpiece 90 is held by the first suction part 13 and the second suction part 23. At this time, the second hand body 21 is separated from the first hand body 11 in the first direction X. The suction bodies 14 and 15 of the first suction part 13 are separated from each other in the second direction Y, and extend in parallel to each other in the first direction X. The suction bodies 24 and 25 of the second suction part 23 are also separated from each other in the second direction Y, and extend in parallel to each other in the first direction X.

The pair of suction bodies 14 and 15 are attached to a lower-end part of the first hand body 11 via a bracket 16. The bracket 16 is formed in a plate shape, and also in a U-shape in the plan view. The bracket 16 has a base part extending in the second direction Y, and a pair of tip-end parts extending in the first direction X from both ends of the base part. An upper surface of the base part is coupled to the lower-end part of the first hand body 11. The pair of suction bodies 14 and 15 are attached to lower surfaces of the tip-end parts of the bracket 16. The suction bodies 14 and 15 are longer than the tip-end part of the bracket 16. End faces of base-end parts of the suction bodies 14 and 15 are located substantially at the same position as an end face of the base part of the bracket 16 in the first direction X. Tip-end parts of the suction bodies 14 and 15 protrude from the tip-end part of the bracket 16 in the first direction X. The second suction part 23 is constructed similarly to this. Tip-end parts of the two brackets 16 and 26 oppose to each other.

One suction body 24 of the second suction part 23 is located between the pair of suction bodies 14 and 15 of the first suction part 13 in the second direction Y. In this embodiment, the suction bodies 24 and 25 of the second suction part 23 also form a pair. One suction body 15 of the first suction part 13 is located between the pair of suction bodies 24 and 25 of the second suction part 23 in the second direction Y. According to the relative movement of the second hand body 21 with respect to the first hand body 11 in the first direction X, an entering amount D24 into an area between the suction bodies 14 and 15 of the suction body 24 is changed. Further, according to the relative movement, an entering amount D15 into an area between the suction bodies 24 and 25 of the suction body 15 is changed. In principle, the transfer of the workpiece 90 is performed in a state where the suction body 24 enters into the area and the suction body 15 enters into the area.

Figure 3:
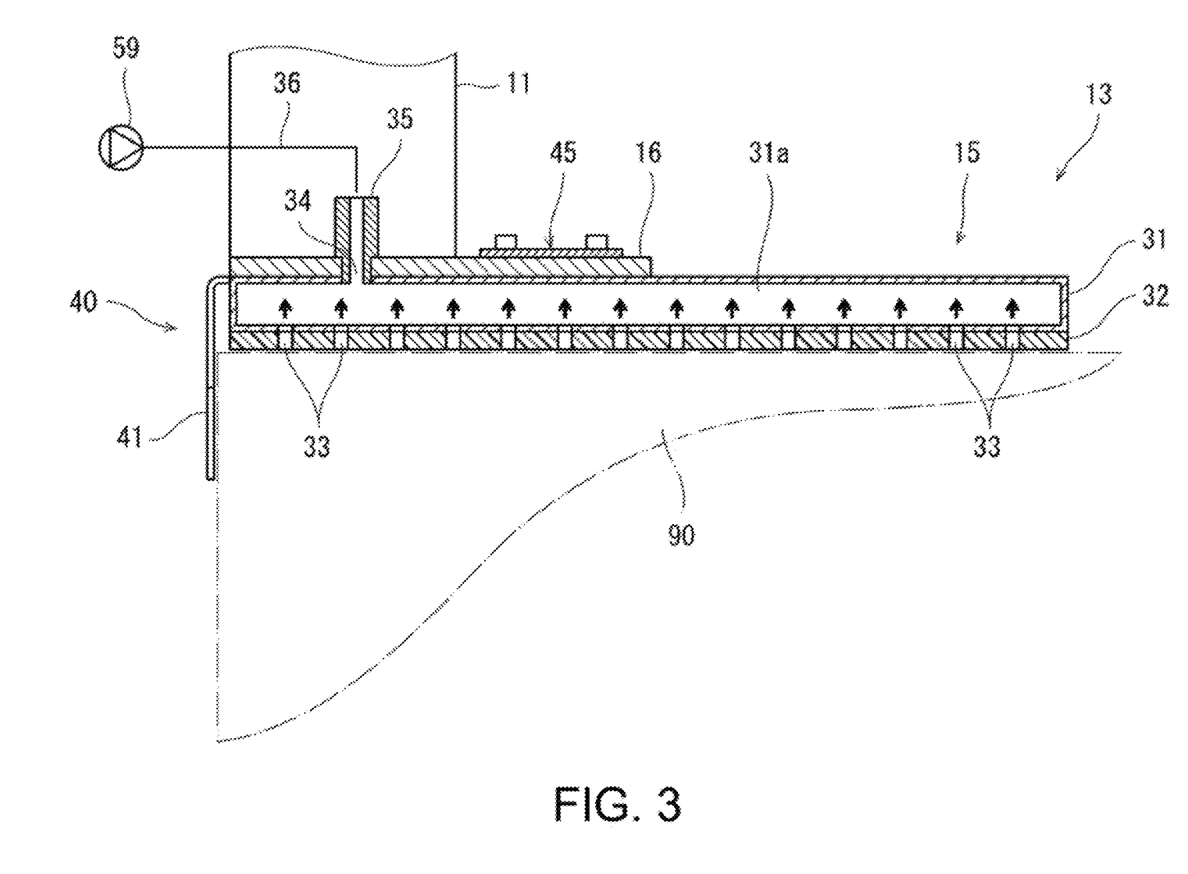
FIG. 3 is a cross-sectional view of a suction body according to this embodiment.

FIG. 3 is a cross-sectional view of the suction body 15. Since other suction bodies 14, 24, and 25 are constructed similarly, redundant description is omitted. The suction body 15 has a body member 31, an elastic member 32, a plurality of suction openings 33, and a discharge port 34. The body member 31 is formed hollow inside and, therefore, it has a closed interior space 31a. The outer shape of the body member 31 and the interior space 31a each has a rectangular cross-section as one example. The material of the body member 31 is not limited in particular. The body member 31 is made of metallic material, such as stainless steel or aluminum alloy, as one example. An outer lower surface of the body member 31 is formed in a flat surface.

The elastic member 32 is formed in a belt shape and covers the outer lower surface of the body member 31. The elastic member 32 is comprised of a foamed body made of material having flexibility, such as EPDM rubber. The cell structure of the foamed body may be a closed-cell type, an open-cell type, or half-closed half-open type. When the elastic member 32 receives a load in the plate-thickness direction, internal air bubbles (cells) shrink and, therefore, the elastic member 32 is compressively deformed in the plate-thickness direction. Thus, the elastic member 32 has flexibility and softness in terms of material and/or structure. If it is the half-closed half-open type, since the airtightness similar to the closed-cell type is securable when the compressive deformation takes place, while increasing the compressive deformation amount and the flexibility, the certainty of the workpiece suction increases. The plurality of suction openings 33 penetrate the elastic member 32 and a lower wall part of the body member 31, and are disposed at a substantially equal interval in the first direction X. Each suction opening 33 is opened in the interior space 31a of the body member 31, and opens in a lower surface of the elastic member 32 (a lower surface of the entire suction body 15). The discharge port 34 penetrates an upper wall part of the body member 31 and the bracket 16. A hose joint 35 is inserted into the discharge port 34 from above, and is fixed to the upper surface of the bracket 16. One end of a hose 36 is attached to the hose joint 35. The other end of the hose 36 is connected to a negative pressure source 59 which generates negative pressure applied to the suction part 13. The negative pressure source 59 is comprised of a vacuum generator, such as an ejector, a pump, or a blower. When the negative pressure source 59 is activated, negative pressure is applied to the plurality of suction openings 33 via the hose 36 and the interior space 31a of the body member 31, and an object can be sucked to the lower surface of the suction body 15.

As illustrated in FIGS. 1 and 2, the transfer robot 1 includes a first positioning mechanism 40 and a second positioning mechanism 45. The first positioning mechanism 40 is provided to each of the first hand body 11 and the second hand body 21, and positions the second hand body 21 in the first direction X with respect to the first hand body 11 by contacting an outer side surface of the workpiece 90 (particularly, the outer side surface oriented in the first direction X). The first positioning mechanism 40 has a first contact part 41 supported by the first hand body 11 and a second contact part 42 supported by the second hand body 21. The first contact part 41 and the second contact part 42 each has a contact surface which extends in the vertical direction and the second direction Y, and is oriented in the first direction X. The two contact surfaces are located below the lower surfaces of the suction bodies 14, 15, 24, and 25. Further, the suction bodies 14, 15, 24, and 25 are located between the two contact surfaces in the first direction X. The contact surface of the first contact part 41 contacts one of the outer side surfaces of the workpiece 90, and the contact surface of the second contact part 42 contacts the outer side surface on the opposite side in the first direction X from the outer side surface with which the first contact part 41 contacts. In this embodiment, the first contact part 41 is fixed to the base part of the bracket 16, and the second contact part 42 is fixed to the base part of the bracket 26.

The second positioning mechanism 45 is provided to the first hand body 11 and the second hand body 21, and positions the first hand body 11 and the second hand body 21 in the second direction Y with respect to the workpiece 90 by contacting the outer side surface of the workpiece 90 (particularly, the outer side surface oriented in the second direction Y). The second positioning mechanism 45 has a first contact part 46 supported by the first hand body 11, and a second contact part 47 supported by the second hand body 21. The first contact part 46 and the second contact part 47 each has a contact surface which extends in the vertical direction and the first direction X. The two contact surfaces are located below the lower surfaces of the suction bodies 14, 15, 24, and 25. The contact surface of the first contact part 46 is separated from one suction body 15 among the pair of suction bodies 14 and 15 by an interval D46 on one side in the second direction Y. The contact surface of the second contact part 47 is separated from one suction body 25 among the pair of suction bodies 24 and 25 by an interval D47 on one side in the second direction Y. The interval D46 of the first contact part 46 differs from the interval D47 of the second contact part 47. The difference between the interval 46 and the interval D47 is at least more than the size of the suction body in the second direction Y. Either one of the interval D46 and the interval D47 may be larger than the other. In this embodiment, the interval D46 of the first contact part 46 is relatively larger, as a mere example. The two contact surfaces contact the surface among the outer side surfaces of the workpiece, which is oriented to one side in the second direction Y. In this embodiment, the first contact part 46 is fixed to the upper surface of the tip-end part of the bracket 16, and the second contact part 47 is fixed to the upper surface of the tip-end part of the bracket 26.

Figure 4:
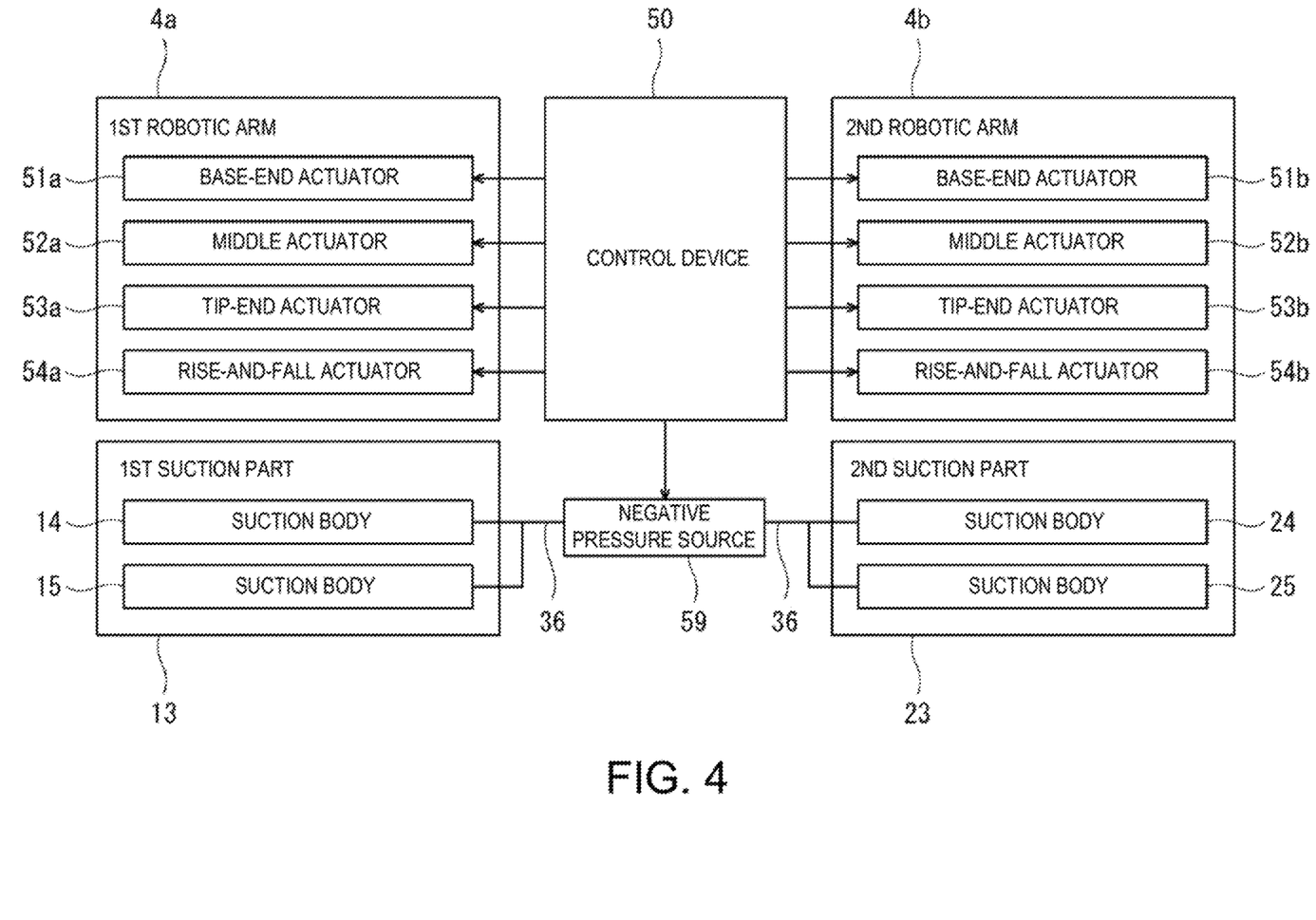
FIG. 4 is a block diagram illustrating a control system of the transfer robot according to this embodiment.

FIG. 4 is a block diagram illustrating a control system of the transfer robot 1. The transfer robot 1 is provided with a control device 50. The control device 50 is accommodated in the base 3 of the dual-arm robot, as one example (see FIG. 1). The control device 50 includes a memory which stores a program according to execution of the work for transferring the workpiece 90, a CPU which executes the program stored in the memory, and an interface connected to various actuators controlled by the program concerned.

The actuators provided to the first robotic arm 4a include a base-end actuator 51a which rotates the first base-end arm 5a with respect to the base 3, a middle actuator 52a which rotates the first tip-end arm 6a with respect to the first base-end arm 5a, a tip-end actuator 53a which rotates the first attaching part 8a with respect to the first tip-end arm 6a or the first wrist part 7a, and a rise-and-fall actuator 54a which lifts and lowers the first wrist part 7a with respect to the first tip-end arm 6a. Similarly, the actuators provided to the second robotic arm 4b includes a base-end actuator 51b, a middle actuator 52b, a tip-end actuator 53b, and a rise-and-fall actuator 54b. The actuator of which operation is controlled by the control device 50 includes the negative pressure source 59 which generates negative pressure applied to the first suction part 13 and the second suction part 23. In FIG. 4, as a mere example, although the four suction bodies 14, 15, 24, and 25 share a sole negative pressure source 59, the negative pressure sources may be provided to the four suction bodies on a 1-on-1 basis, or the negative pressure sources may be provided to the two suction parts on a 1-on-1 basis and two suction bodies of the corresponding suction part may share one negative pressure source.

Figure 5:
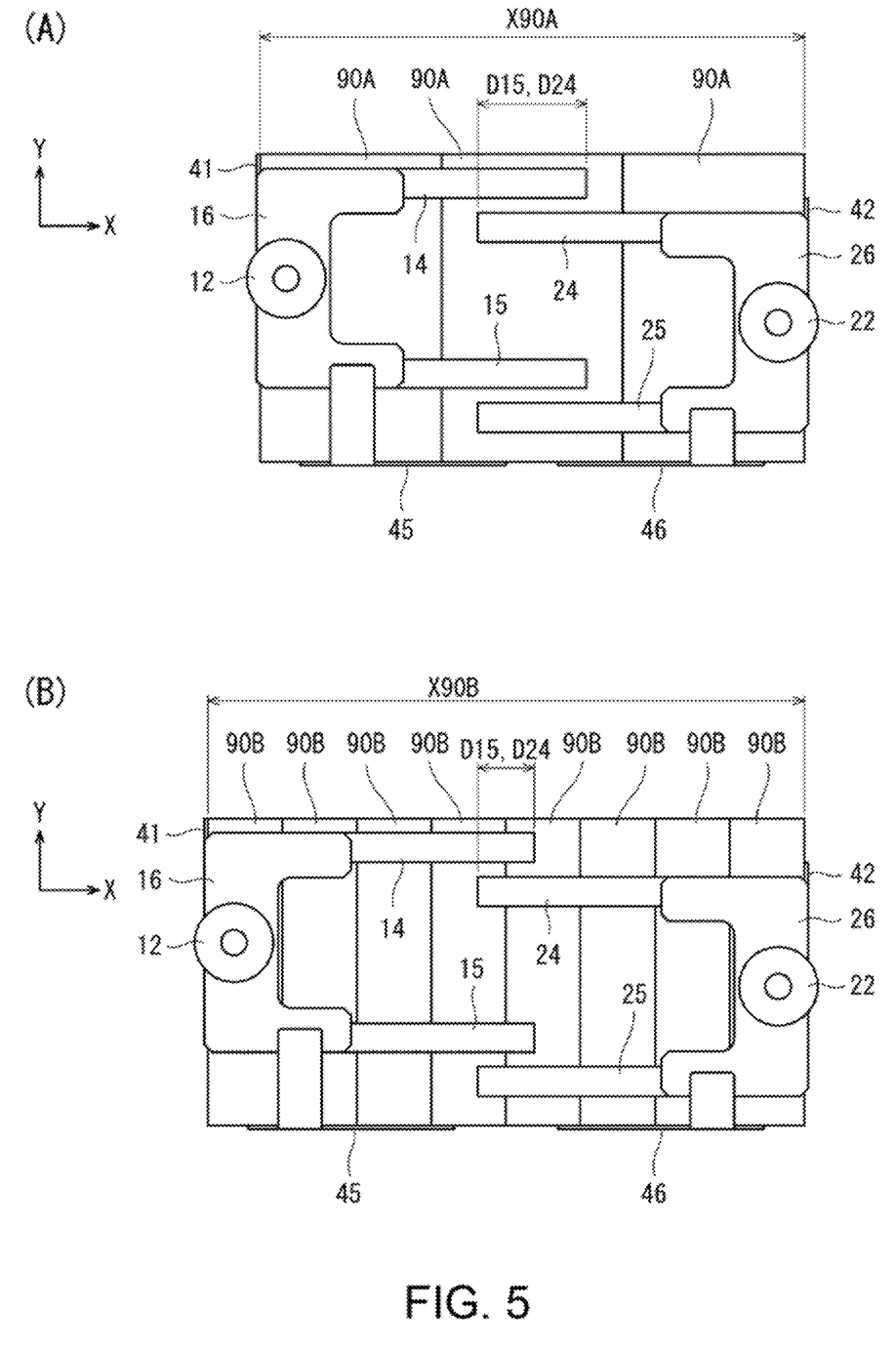

FIGS. 5A and 5B illustrate one example of the work performed by the transfer robot 1. The transfer robot 1 collectively transfers a plurality of workpieces 90 each having the box shape. At this time, it collectively transfers the plurality of workpieces 90, after making the workpieces 90 into an aligned state in which the workpieces 90 entirely form a rectangular shape in the plan view. The plurality of workpieces 90 made into the aligned state are accommodated in a box prepared separately. The transfer robot 1 according to this embodiment also serves as a picking robot or a boxing robot. The box where the workpieces 90 are accommodated is transferred to a location in front of the robot 1 by a known transfer mechanism, such as a belt conveyer. Typically, this box is a cardboard box of which an upper part is opened and closed with flaps. The transfer robot 1 hauls the transferred boxes by using the hand bodies 11 and 21 and positions them at a given position, and opens the flaps outside by using the contact parts 41, 42, 46, and 47 of the positioning mechanisms 40 and 45. Thus, a work for preparing the boxing is also performed by the transfer robot 1. After the preparing work, the transfer and boxing of the workpieces are performed.

According to the transfer robot 1 according to this embodiment, even if the size of the workpieces fed to the location in front of the transfer robot 1 (i.e., the size of the boxes where the workpieces are accommodated) is changed, the picking, the transferring, and the boxing can be continued without a tool changeover.

Referring to FIG. 5A, first, a transfer of workpieces 90A having a first size is described. The workpieces 90A having the first size are sequentially fed to the transfer robot 1 by using the known transfer mechanism, such as a belt conveyer. The transfer robot 1 lifts three workpieces 90A all at once, and boxes the workpieces into another box.

When the three workpieces 90A are fed to a location in front of the base 3 of the transfer robot 1, the first robotic arm 4a and the second robotic arm 4b are activated to make the three workpieces 90A into the aligned state by using the operation of the first positioning mechanism 40 and the second positioning mechanism 45.

The transfer robot 1 stands by the supply of the workpieces 90A in a state where the contact parts 41 and 42 of the first positioning mechanism 40 and the contact parts 46 and 47 of the second positioning mechanism 45 are located above the fed workpieces 90A. The transfer robot 1 stands by the supply of the workpieces 90A in a state where the contact surface of the first positioning mechanism 40 is located outside in the first direction X of an edge line in the plan view of the fed three workpieces 90A, and the contact surface of the second positioning mechanism 45 is located outside in the second direction Y of one of edge lines in the plan view of the fed three workpieces 90A.

In order to make the three workpieces 90A into the aligned state, the first robotic arm 4a and the second robotic arm 4b are operated, and the first hand body 11 and the second hand body 21 are lowered until the contact surface of the first positioning mechanism 40 overlaps with the workpiece 90A when seen in the first direction X, and until the contact surface of the second positioning mechanism 45 overlaps with the workpiece 90A when seen in the second direction Y.

The first robotic arm 4a and the second robotic arm 4b are operated to move the first hand body 11 and the second hand body 21 to the other side in the second direction Y so that the contact surface of the second positioning mechanism 45 is pressed against the side surfaces of the workpieces 90A. Therefore, the three workpieces 90A are aligned in the second direction Y, and the first hand body 11 and the second hand body 21 are positioned in the second direction Y with respect to the workpiece 90A. Further, the four suction bodies 14, 15, 24, and 25 are positioned in the second direction Y. Since the difference between the interval D46 and the interval D47 is larger than the size of the suction bodies 14, 15, 24, and 25 in the second direction Y, the suction bodies 14 and 15 of the first suction part 13 does not interfere with the suction bodies 24 and 25 of the second suction part 23.

The first robotic arm 4a and the second robotic arm 4b are operated to bring the first hand body 11 and the second hand body 21 closer to each other in the first direction X, and press the contact surface of the first positioning mechanism 40 against the side surfaces of the workpieces 90A. Therefore, the three workpieces 90A becomes in a state where gaps between them are eliminated in the first direction X. The entering amount D24 of the suction body 24 and the entering amount D15 of the suction body 15 becomes the values according to the total dimension of the three workpieces 90A in the first direction X with no-gap state. Here, the total dimension X90A of the three workpieces 90A in the first direction X with no-gap state is smaller than the sum of the lengths of the suction bodies 14 and 15 of the first suction part 13 and the lengths of the suction bodies 24 and 25 of the second suction part 23, respectively. Therefore, the suction body 24 enters between the suction bodies 14 and 15, and the suction body 15 enters between the suction bodies 24 and 25.

Here, the movement of the first hand body 11 and the second hand body 21 in the second direction Y, the movement of the first hand body 11 in the first direction X, and the movement of the second hand body 21 in the first direction X may be performed simultaneously or may be performed sequentially.

When the workpieces 90A become in the aligned state, the first robotic arm 4a and the second robotic arm 4b are operated to lower the first hand body 11 and the second hand body 21 so that the lower surfaces of the suction bodies 14, 15, 24, and 25 are pressed against the upper surfaces of the workpieces 90A. The lower surfaces of the suction bodies 14, 15, 24, and 25 are comprised of the elastic member 32 and, this elastic member 32 has flexibility. The elastic member 32 closely contacts the upper surface of the workpiece 90A, and the suction openings 33 is closed by the elastic member 32. At least any of the four suction bodies 14, 15, 24, and 25 is placed on the upper surfaces of the three workpieces 90A. The left workpiece 90A closely contacts the lower surfaces of the pair of suction bodies 14 and 15 of the first suction part 13, the right workpiece 90A closely contacts with the lower surfaces of the pair of suction bodies 24 and 25 of the second suction part 23, and the center workpiece 90A closely contacts with the lower surfaces of four suction bodies 14, 15, 24, and 25.

In this state, the negative pressure source 59 is operated to apply the negative pressure to the suction openings 33. Therefore, the three workpieces 90A are sucked to the first suction part 13 and the second suction part 23. The elastic member 32 has flexibility and, thus, even if the upper surfaces of the workpieces 90A have irregularity, the elastic member 32 can be deformed conforming to the irregularity so that the suction bodies 14, 15, 24, and 25 closely contact the workpieces 90A. In this embodiment, each of the suction bodies 14, 15, 24, and 25 covers or overlaps with a plurality of workpieces 90A. Even if a certain suction opening 33 is located above a clearance between the adjacent workpieces 90A, this suction openings 33 can be closed by the deformation of the elastic member 32, and therefore, it is suppressed that this suction opening 33 is opened to the atmosphere via the clearance. Therefore, even if the plurality of suction openings 33 communicate with each other via the single interior space 31a, the negative pressure can be normally generated in the remaining suction openings 33 and, thus, the workpiece 90A can be sucked.

While operating the negative pressure source 59, the first robotic arm 4a and the second robotic arm 4b are operated to move the first hand body 11 and the second hand body 21, without changing the position and the posture of the first hand body 11 with respect to the second hand body 21. Thus, the three workpieces 90A are lifted while being in the aligned state, and they are transferred by the first robotic arm 4a and the second robotic arm 4b. Once the workpieces 90A are boxed, the negative pressure source 59 is suspended so that the three workpieces 90A are released from the first suction part 13 and the second suction part 23.

Next, referring to FIG. 5B, a transfer of the workpiece 90B having a second size is described. The workpiece 90B having the second size is also sequentially fed to the location in front of the transfer robot 1 by a known transfer mechanism. The transfer robot 1 lifts eight workpieces 90B all at once, and performs a work in which the workpieces 90B are boxed in another box. The total dimension X90B of the eight workpieces 90B in the first direction X with no-gap state differs from the total dimension X90A of the three workpieces 90A described above (in this embodiment, the size X90B is larger than the size X90A, as a mere example).

Also in this case, similarly to the above, the movement of the first hand body 11 and the second hand body 21 in the second direction Y, the movement of the first hand body 11 in the first direction X, and the movement of the second hand body 21 in the first direction X, the descent of the first hand body 11 and the second hand body 21, and the operation of the negative pressure source 59 are performed. Since the total dimension X90B differs from the above, the moving amount of the first hand body 11 in the first direction X and/or the moving amount of the second hand body 21 in the first direction X differ from the above. However, similarly to the above, the operation of the first positioning mechanism 40 can bring the eight workpieces 90B closer to each other in the first direction X to reduce the gaps so that the eight workpieces 90B are made into the aligned state. The operation of the first positioning mechanism 40 automatically adjusts the entering amount D15 of the suction body 15 and the entering amount D24 of the suction body 24 according to the total dimension X90B of the workpieces 90B. Note that, also in this example, the lower surface(s) of one or more of the four suction bodies 14, 15, 24, and 25 is placed on the upper surfaces of the eight workpieces 90B. The upper surfaces of the three left workpieces 90B closely contact the lower surfaces of the suction bodies 14 and 15 of the first suction part 13, and the upper surfaces of the three right workpieces 90B closely contact the lower surfaces of the suction bodies 24 and 25 of the second suction part 23, and the upper surfaces of the two center workpieces 90B closely contact the lower surfaces of the four suction bodies 14, 15, 24, and 25.

Thus, according to this embodiment, the first suction part 13 having the pair of suction bodies 14 and 15, and the second suction part 23 having the suction body 24 are dividedly provided to the first hand body 11 and the second hand body 21, respectively. The entering amount D24 of the suction body 24 into the area between the pair of suction bodies 14 and 15 is changed according to the relative movement of the second hand body 21 in the first direction X with respect to the first hand body 11.

Even if the size of the target workpiece 90 is changed in the first direction X, by relatively moving the second hand body 21 with respect to the first hand body 11, the size of the entire suction part in the first direction X can be adjusted without causing the interference between the first suction part 13 and the second suction part 23. As one example, the size of the entire suction part in the first direction X is a distance in the first direction X from the base end of the suction body of the first suction part 13 to the base end of the suction body of the second suction part 23, and it is adjusted according to the change in the entering amount D24. Therefore, the transfer of the workpiece 90 can be continued without a tool changeover, such as a replacement of the hand body (outside stage replacement). Further, a suction surface area increases in the center part of the workpieces 90 in the first direction X, and therefore, the workpieces 90 can be stably lifted.

In this embodiment, the suction bodies 24 and 25 form a pair also in the second suction part 23. The entering amount D25 of the suction body 15 of the first suction part into the area between the pair of suction bodies 24 and 25 is changed according to the relative movement of the second hand body 21 in the first direction X with respect to the first hand body 11. Because of the increase in the suction surface area, the workpiece 90 can be stably lifted.

The elastic member is applied to the lower part of the suction body. Even if the suction body is an elongated body or even if the single suction body needs to suck the upper surfaces of the plurality of workpieces 90, the lower surface of the suction body can closely contact the upper surfaces of the workpieces 90, and therefore, the workpieces 90 can be stably lifted.

The transfer robot 1 includes the first positioning mechanism 40 and the second positioning mechanism 45 provided to the first hand body 11 and the second hand body 21. When the plurality of workpieces 90 are lifted all at once by using the operation of the first positioning mechanism 40, the workpieces 90 are brought closer to each other in the first direction X so that the workpieces 90 become in the aligned state. When lifting the plurality of workpieces 90 all at once by using the operation of the second positioning mechanism 45, the workpieces 90 are aligned in the second direction Y. Moreover, the second hand body 21 can be positioned in the second direction Y with respect to the first hand body 11, and therefore, the interference prevention of the suction bodies and the stable transfer of the workpieces 90 can be realized.

Although the embodiment is described so far, changes, additions, and/or omissions are suitably possible for the above configuration without departing from the scope of the present disclosure.

The transfer robot 1 is not limited to the coaxial dual-arm robot. In the case of the dual-arm robot, the base-end parts of the first robotic arm 4a and the second robotic arm 4b may be coupled to the base so as to be pivotable on individual axes which are not coaxial. Alternatively, the transfer robot may be comprised of two robots of a first robot provided with the first robotic arm 4a, and a second robot provided with the second robotic arm 4b, and the above-described transfer may be realized by a collaborative control of the two robots. The first robotic arm 4a and the second robotic arm 4b may be vertical articulated types. Only one suction body may be provided to the second suction part. The first suction part and the second suction part may have three or more suction bodies, respectively. Not only the plurality of workpieces 90 which are lined up laterally but also the single workpiece can be handled.

What is claimed is:

1. A transfer robot configured to transfer workpieces while sucking upper surfaces of the workpieces, comprising:
   a first robotic arm and a second robotic arm;
   a first hand body attached to the first robotic arm and configured to move according to operation of the first robotic arm;
   a second hand body attached to the second robotic arm and configured to move according to operation of the second robotic arm;
   a first sucker attached to the first hand body and configured to suck the upper surfaces of the workpieces; and
   a second sucker attached to the second hand body and configured to suck the upper surfaces of the workpieces,
   wherein the first sucker includes a pair of suction bodies, the pair of suction bodies extending in a first direction which is horizontal and separated from each other in a second direction which is horizontal and perpendicular to the first direction, and
   wherein the second sucker includes at least one suction body extending in the first direction, and the at least one suction body is changeable in an entering amount into an area between the pair of suction bodies of the first sucker according to a relative movement of the second hand body in the first direction with respect to the first hand body.

2. The transfer robot of claim 1, wherein the second sucker includes a pair of suction bodies separated from each other in the second direction and extending in the first direction, and
   wherein one of the pair of suction bodies of the first sucker is changeable in an entering amount into an area between the pair of suction bodies of the second sucker according to the relative movement.

3. The transfer robot of claim 1, further comprising:
   a negative pressure source configured to generate negative pressure applied to the first sucker,
   wherein each of the suction bodies includes:
   a body having an interior space spatially connected to the negative pressure source;

an elastic structure including a foamed body and having flexibility, and configured to cover a lower surface of the body; and a plurality of suction openings at intervals in the first direction and penetrating the elastic structure and the body and opened to the interior space.

4. The transfer robot of claim 1, further comprising:
a first positioner at the first hand body and the second hand body and configured to position the second hand body in the first direction with respect to the first hand body by contacting side surfaces of the workpieces.

5. The transfer robot of claim 1, further comprising:
a second positioner at the first hand body and the second hand body and configured to position the first hand body and the second hand body in the second direction with respect to the workpieces by contacting side surfaces of the workpieces.

6. The transfer robot of claim 1, further comprising:
a base;
a first base-end part of the first robotic arm; and
a second base-end part of the second robotic arm,
wherein the first base-end part of the first robotic ailu and the second base-end part of the second robotic arm are coupled to the base so as to be pivotable on a co-axis.

7. A transfer robot configured to transfer workpieces while sucking upper surfaces of the workpieces, comprising:
a first robotic arm and a second robotic arm;
a first hand body attached to the first robotic arm and configured to move according to operation of the first robotic arm;
a second hand body attached to the second robotic arm and configured to move according to operation of the second robotic arm;
a first means for sucking attached to the first hand body and configured to suck the upper surfaces of the workpieces; and
a second means for sucking attached to the second hand body and configured to suck the upper surfaces of the workpieces,
wherein the first means for sucking includes a pair of means for suctioning, the pair of means for suctioning extending in a first direction which is horizontal and separated from each other in a second direction which is horizontal and perpendicular to the first direction, and
wherein the second means for sucking includes at least one means for suctioning extending in the first direction, and the at least one means for suctioning is changeable in an entering amount into an area between the pair of means for suctioning of the first means for sucking according to a relative movement of the second hand body in the first direction with respect to the first hand body.

8. The transfer robot of claim 7, wherein the second means for sucking includes a pair of means for suctioning separated from each other in the second direction and extending in the first direction, and
wherein one of the pair of means for suctioning of the first means for sucking is changeable in an entering amount into an area between the pair of means for suctioning of the second means for sucking according to the relative movement.

9. The transfer robot of claim 7, further comprising:
a neuative pressure source configured to generate negative pressure applied to the first means for sucking,
wherein each of the means for suctioning includes:
a body having an interior space spatially connected to the negative pressure source;
an elastic structure including a foamed body and having flexibility, and configured to cover a lower surface of the body; and
a plurality of suction openings at intervals in the first direction and penetrating the elastic structure and the body and opened to the interior space.

10. The transfer robot of claim 7, further comprising:
a first positioner at the first hand body and the second hand body and configured to position the second hand body in the first direction with respect to the first hand body by contacting side surfaces of the workpieces.

11. The transfer robot of claim 7, further comprising:
a second positioner at the first hand body and the second hand body and configured to position the first hand body and the second hand body in the second direction with respect to the workpieces by contacting side surfaces of the workpieces.

12. The transfer robot of claim 7, further comprising:
a base;
a first base-end part of the first robotic arm; and
a second base-end part of the second robotic arm,
wherein the first base-end part of the first robotic arm and the second base-end part of the second robotic arm are coupled to the base so as to be pivotable on a co-axis.

* * * * *